(12) United States Patent
Facciano et al.

(10) Patent No.: US 8,729,443 B2
(45) Date of Patent: May 20, 2014

(54) PROJECTILE AND METHOD THAT INCLUDE SPEED ADJUSTING GUIDANCE AND PROPULSION SYSTEMS

(75) Inventors: Andrew B. Facciano, Tucson, AZ (US); James A. Ebel, Vail, AZ (US); Michael Alkema, Sahuarita, AZ (US); Robert D. Travis, Tucson, AZ (US); Mike J. Saxton, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 552 days.

(21) Appl. No.: 13/020,276

(22) Filed: Feb. 3, 2011

(65) Prior Publication Data

US 2012/0181373 A1 Jul. 19, 2012

Related U.S. Application Data

(60) Provisional application No. 61/382,332, filed on Sep. 13, 2010.

(51) Int. Cl.
*F42B 15/01* (2006.01)
*F42B 10/32* (2006.01)
*F42B 15/00* (2006.01)
*F42B 10/00* (2006.01)

(52) U.S. Cl.
USPC ......... 244/3.15; 244/3.1; 244/3.21; 244/3.22; 701/1; 701/3; 701/4; 701/13

(58) Field of Classification Search
USPC .......... 244/3.1–3.3, 4 R, 12.1, 12.3, 53 R, 54, 244/55, 58, 59, 158.1, 171.1, 75.1, 76 R, 244/175, 180, 181, 182; 89/1.11; 701/1, 3, 701/4, 13
See application file for complete search history.

(56) References Cited

U.S. PATENT DOCUMENTS 2,943,822 A * 7/1960 Hamilton ...................... 244/3.22
3,691,356 A * 9/1972 Miller ............................ 244/181
(Continued)

FOREIGN PATENT DOCUMENTS

EP 0058258 A1 * 8/1982 ............... F41G 7/20
FR 2657157 A1 * 7/1991 .............. F42B 10/00
(Continued)

OTHER PUBLICATIONS

"International Application Serial No. PCT/US2011/051199, International Search Report mailed Jan. 31, 2012", 2 pgs
"International Application Serial No. PCT/US2011/051199, Written Opinion mailed Jan. 31, 2012", 5 pgs.
(Continued)

*Primary Examiner* — Bernarr Gregory
(74) *Attorney, Agent, or Firm* — Schwegman, Lundberg & Woessner, P.A.

(57) ABSTRACT

Some embodiments pertain to a projectile and method that includes a flight vehicle and a propulsion system attached to the flight vehicle. The propulsion system includes a plurality of motors that propel the projectile. A guidance system is connected to the propulsion system. The guidance system ignites an appropriate number of the motors to adjust the speed of the projectile based on the location of the projectile relative to a desired destination for the flight vehicle. In some embodiments, the flight vehicle is a kinetic warhead. The projectile may be an interceptor that includes a first propulsion stage, a second propulsion stage and a third propulsion stage that includes the third propulsion system. The number of booster motors that will be ignited by the guidance system depends on the speed that the projectile needs to be adjusted to in order to maneuver the projectile to a desired location.

29 Claims, 6 Drawing Sheets

(56) References Cited

U.S. PATENT DOCUMENTS

| | | | |
|---|---|---|---|
| 3,735,985 A * | 5/1973 | Layer et al. | 244/3.24 |
| 4,867,393 A * | 9/1989 | Faupell et al. | 244/3.22 |
| 4,964,340 A | 10/1990 | Daniels et al. | |
| 5,433,399 A * | 7/1995 | Becker et al. | 244/3.22 |
| 5,788,179 A | 8/1998 | Wicke | |
| 6,208,915 B1 * | 3/2001 | Schutte et al. | 701/3 |
| 7,566,026 B2 * | 7/2009 | Lam et al. | 244/3.15 |
| 8,047,472 B1 * | 11/2011 | Brand et al. | 244/158.1 |
| 2009/0127377 A1 | 5/2009 | Lam et al. | |

FOREIGN PATENT DOCUMENTS

| | | | | |
|---|---|---|---|---|
| WO | WO82/02765 A1 * | 8/1982 | | F41G 7/20 |
| WO | WO-2012/037020 A1 | 3/2012 | | |

OTHER PUBLICATIONS

"International Application Serial No. PCT/US2011/051199, International Preliminary Report on Patentability mailed Mar. 28, 2013", 7 pgs.

* cited by examiner

PROJECTILE AND METHOD THAT INCLUDE SPEED ADJUSTING GUIDANCE AND PROPULSION SYSTEMS

CLAIM OF PRIORITY

This patent application claims the benefit of priority, under 35 U.S.C. §119(e), to U.S. Provisional Patent Application Ser. No. 61/382,332, entitled "PROJECTILE THAT INCLUDE SPEED ADJUSTING GUIDANCE AND PROPULSION SYSTEMS" filed on Sep. 13, 2010, which is hereby incorporated by reference herein in its entirety.

TECHNICAL FIELD

Embodiments pertain to a projectile, and more particularly to a projectile that includes speed adjusting guidance and propulsion systems.

BACKGROUND

Long range projectiles have historically included either liquid-fuel motors or sold-fuel motors. There are drawbacks and benefits associated with each type of motor.

Liquid-fuel motors provide good energy management because they can be turned on and off during operation of the projectile. However, liquid fuels are quite toxic such that they are difficult to store safely, especially in enclosed and crowded environments. In addition, liquid fuels often degrade during long term storage.

Solid-fuel motors are typically easier to store but usually provide only one or two thrust operations (i.e., burns). A typical solid-fuel motor provides axial thrust but might also incorporate lateral thrusters which increase the overall weight of the projectile. In addition, the need for axial and lateral thrusters usually (i) requires valuable space within the projectile making it difficult to efficiently design the projectile; and/or (ii) makes it difficult to efficiently propel the projectile due to hardware complexity associated with having axial and lateral thrusting capability.

There has been some recent development of new propulsion technologies. However, these new propulsion technologies require further development and analysis of operation, transportation, logistics, and long-term storage capabilities.

There is a need for a projectile that includes a solid-fuel propulsion system yet allows the speed of the projectile to be adjusted in a variety of ways in order to acquire a target. The projectile should also be able to cost effectively incorporate existing solid-fuel motors into the propulsion system for safe operation and storage.

SUMMARY

Figure 1:
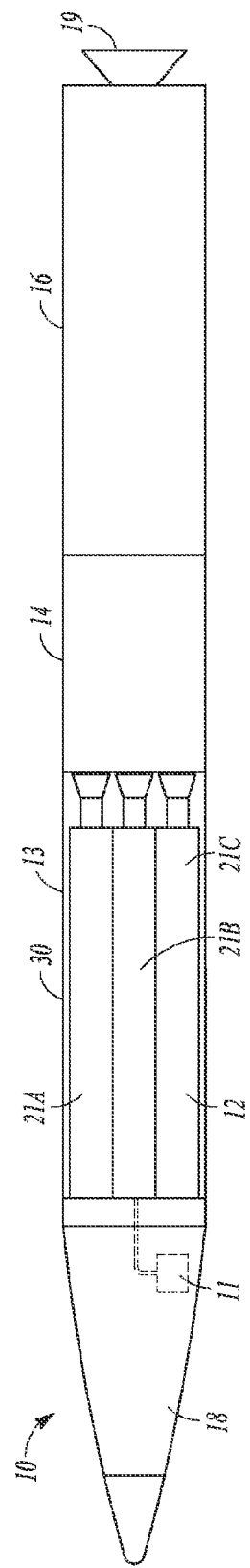
FIG. 1 is a side view of an example projectile in accordance with some embodiments.

Some embodiments pertain to a projectile that includes a flight vehicle and a propulsion system attached to the flight vehicle. The propulsion system includes a plurality of motors that propel the projectile. The projectile further includes a guidance system that is connected to the propulsion system. The guidance system ignites an appropriate number of the motors to adjust the speed of the projectile based on the location of the projectile relative to a desired destination for the flight vehicle.

In some embodiments, each of the motors in the propulsion system is adapted to be ejected from the projectile after burn out. The guidance system may determine whether to eject the burned out motors based on a desired flight pattern of the projectile.

Other embodiments pertain to a method of delivering a projectile that includes a flight vehicle to a desired destination. The method includes using a propulsion system that includes a plurality of motors to propel the projectile toward the desired destination. The method further includes using a guidance system that is connected to the propulsion system to ignite an appropriate number of the motors to adjust the speed of the projectile based on the location of the projectile relative to the desired destination of the flight vehicle.

In some embodiments, the method may further include ejecting motors in the propulsion system from the projectile. As an example, using a guidance system to adjust the speed of the projectile may include determining whether to eject the burned out motors based on a desired flight path of the projectile. In addition, using the propulsion system to propel the projectile toward a desired destination may include using the propulsion system to propel the projectile toward a continually changing location of a moving target.

Still other embodiments pertain to a projectile that is configured to (i) use a propulsion system that includes a plurality of motors to propel the projectile toward the desired destination; and (ii) use a guidance system to ignite an appropriate number of the motors to adjust the speed of the projectile based on the location of the projectile relative to a desired destination for the projectile. The projectile may also be configured to use the guidance system to adjust the speed of the projectile by determining whether to eject burned out motors based on a desired flight path of the projectile toward the desired destination.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As used herein, projectile refers to missiles, interceptors, guided projectiles, unguided projectiles, satellite and submunitions.

Figure 2:
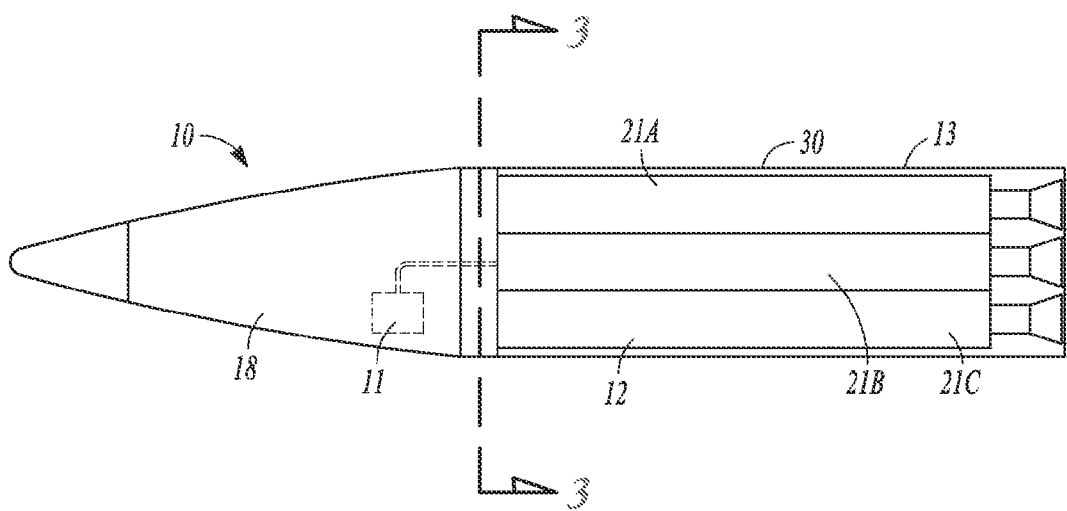
FIG. 2 is side view of the projectile shown in FIG. 1 where first and second boosters have been ejected.
Figure 3:
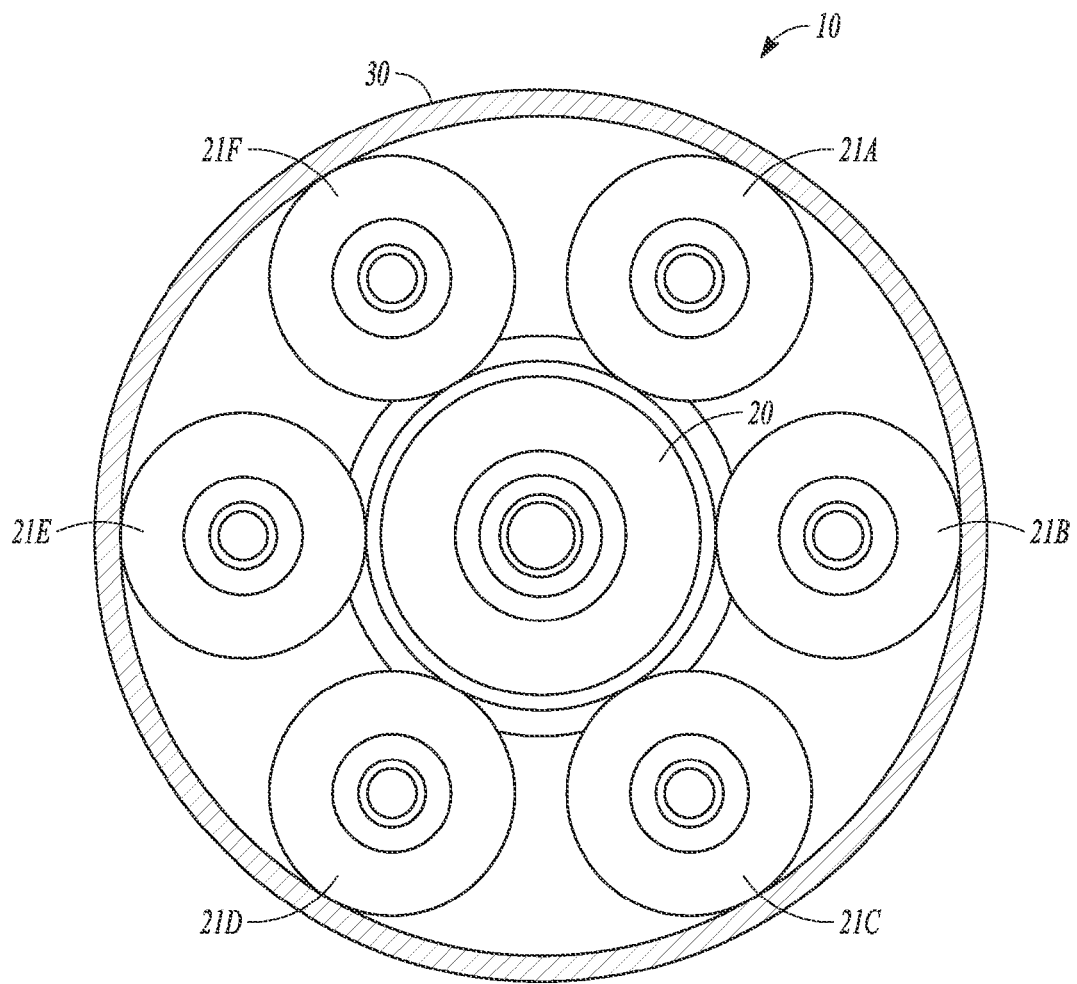
FIG. 3 is schematic section view taken along line 3-3 in FIG. 2.

FIGS. 1-3 illustrate an example projectile 10. In the example embodiment that is illustrated in FIGS. 1-3, the projectile 10 is an interceptor.

The projectile 10 includes a flight vehicle 18 and a propulsion system 12 that is attached to the flight vehicle 18. The propulsion system 12 includes a plurality of motors 20, 21A, 21B, 21C, 21D, 21E, 21F (see FIG. 3) that propel the projectile 10.

A guidance system 11 is connected to the propulsion system 12. The guidance system 11 ignites an appropriate number of the motors 21A, 21B, 21C, 21D, 21E, 21F to adjust the speed of the projectile 10 based on the location of the projectile relative to a desired destination for the flight vehicle 18.

In some embodiments, the flight vehicle 18 is a kinetic warhead. The type of flight vehicle 18 that is included on the projectile 10 will depend in part on the application where the projectile 10 is being used.

In the example embodiment that is illustrated in FIGS. 1-3, the projectile 10 includes a first propulsion stage 16, a second propulsion stage 14 and a third propulsion stage 13. The first propulsion stage 16 is at a tail end 19 of the projectile and the second propulsion stage 14 is positioned between the third propulsion stage 13 and the first propulsion stage 16. The third propulsion stage 13 is between the second propulsion stage 14 and the flight vehicle 18. The propulsion system 12 is part of the third propulsion stage 13. It should be noted that other embodiments are contemplated where the propulsion system 12 forms part of the first and/or second stage 14, 16.

As shown most clearly in FIG. 3, the propulsion system 12 may include a center motor 20 that is surrounded by an even number of booster motors 21A, 21B, 21C, 21D, 21E, 21F (six booster motors are shown in FIG. 3). It should be noted that the number of booster motors that is included in the propulsion system 12 will depend in part on design constraints, cost and the application where the projectile 10 is being used (among other factors).

In some embodiments, the center motor 20 may provide navigational control. The type of center motor 20 that is used in the projectile 10 will depend in part on (i) navigational requirement of the projectile 10; (ii) the mass properties of the flight vehicle 18; and (iii) the desired aerodynamic stability during flight (among other factors. It should be noted that the center motor 20 may include axial and/or lateral thrust capability.

In the illustrated example embodiments, the third propulsion stage 13 of the projectile includes a casing 30 such that the propulsion system 12 is inside the casing 30. It should be noted that embodiments are contemplated where the booster motors 21A, 21B, 21C, 21D, 21E, 21F are outside the casing 30. Placing the propulsion system 12 in the third stage 13 of the projectile 10 simplifies the design and operation of the remaining stages 18, 14, 16 of the projectile 10.

The guidance system 11 ignites an appropriate number of the booster motors 21A, 21B, 21C, 21D, 21E, 21F to adjust the speed of the projectile 10 based on the location of the projectile 10 relative to a desired destination for the flight vehicle 18. In some embodiments, the guidance system 11 may ignite booster motors on opposing sides of the center motor 20. As an example, the guidance system 11 may ignite booster motors 21A, 21D, booster motors 21B, 21E or booster motors 21C, 21F.

In other embodiments, the guidance system 11 may ignite booster motors positioned at equal intervals around the center motor 20. As an example, the guidance system 11 may ignite booster motors 21A, 21C, 21E or booster motors 21B, 21D, 21F.

It important to note that the number of booster motors 21A, 21B, 21C, 21D, 21E, 21F that will be ignited by the guidance system 11 will depend on the speed that the projectile 10 needs to be adjusted to in order to maneuver the projectile 10 to a desired location. This appropriate speed will be calculated by the guidance system 11 based on data that is provided to the guidance system 11.

It should be noted that the guidance system 11 may utilize a variety of different data in order to calculate the appropriate speed for the projectile 10. As an example, the desired destination of the projectile 10 may be a location of a target, and more specifically, a continually changing location of a moving target (e.g., a ballistic missile).

Figure 4:
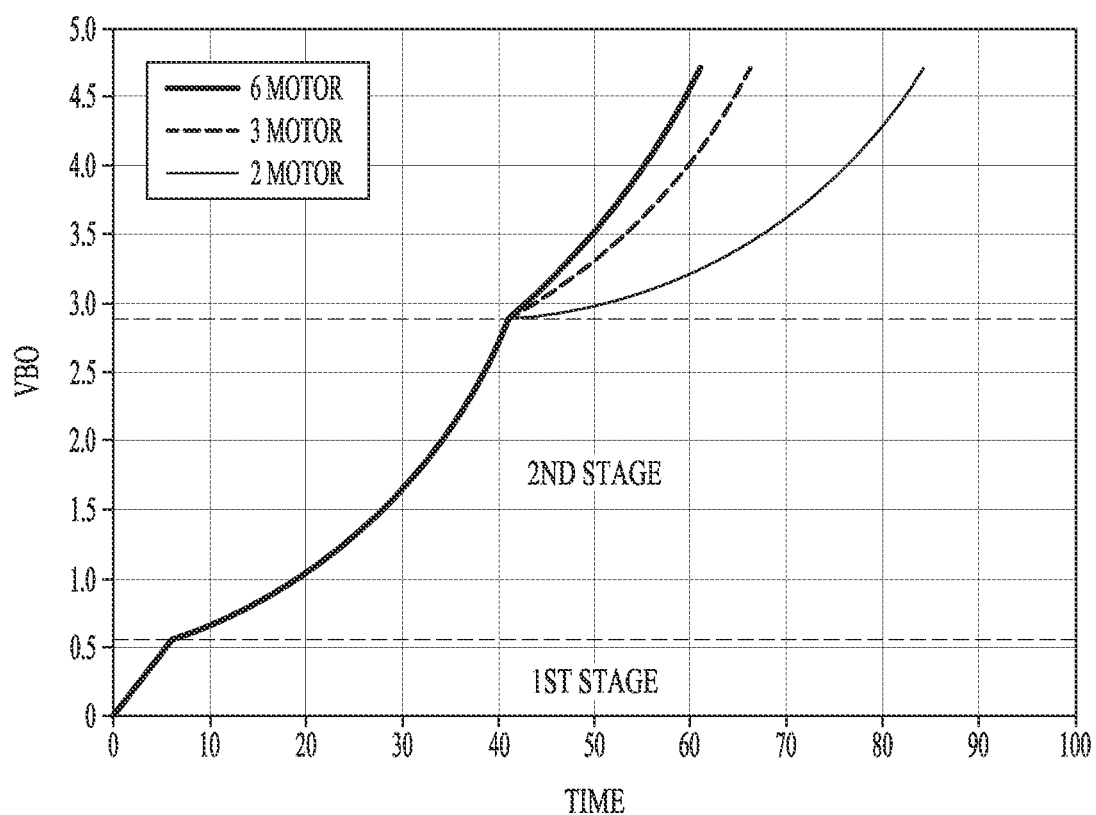
FIG. 4 is a graph that illustrates some example velocity paths that the projectile shown in FIGS. 1 and 2 may travel as the projectile maneuvers to a desired location.

As shown in FIG. 4, the configuration of the guidance system 11 and the propulsion system 12 allows the projectile 10 to be maneuvered along a variety of velocity paths and the guidance system determines the appropriate velocity path based on data that is provided to the guidance system 11. It should be noted that the data for the guidance system 11 may be collected internally within the projectile 10 or delivered to the projectile 10 from an external source (e.g. a tracking station).

During operation of the projectile 10, the guidance system 11 determines the appropriate velocity that the projectile needs to be traveling at and ignites the appropriate number of booster motors 21A, 21B, 21C, 21D, 21E, 21F. The more booster motors 21A, 21B, 21C, 21D, 21E, 21F that are ignited, the faster the projectile 10 will travel.

As an example, the guidance system 11 may ignite two motors then ignite two more motors and then ignite the final two motors. In some embodiments, the guidance system 11 may ignite some of motors before already ignited motors have burned out in order to achieve the appropriate velocity for the projectile 10. In addition, the guidance system 11 may only ignite some of the motors 21A, 21B, 21C, 21D, 21E, 21F before the projectile 10 reaches a desired destination depending on the desired velocity of the projectile 10.

In some embodiments, each of the motors 20, 21A, 21B, 21C, 21D, 21E, 21F in the propulsion system 12 may be adapted to be ejected from the projectile 10 after burn out. The motors 20, 21A, 21B, 21C, 21D, 21E, 21F may be ejected laterally or out of the rear of casing 30 (see FIG. 3) and will depend in part on the overall configuration of the projectile 10.

Figure 5:
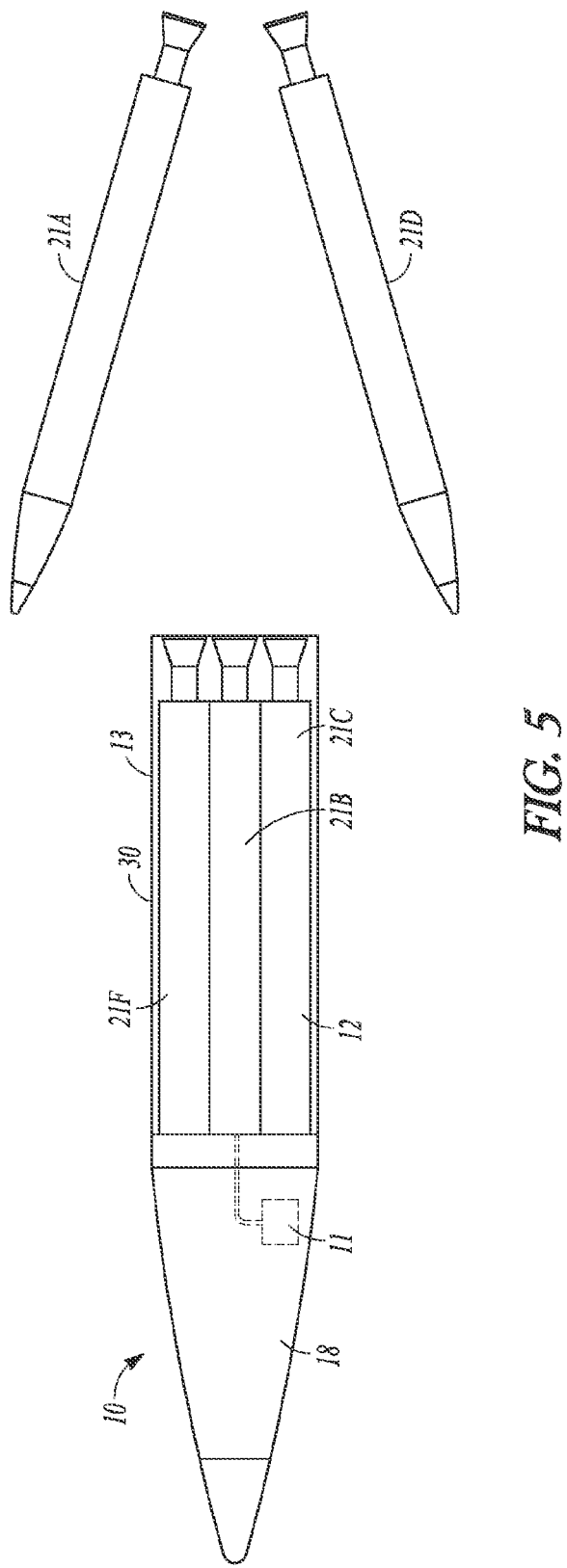
FIG. 5 shows the projectile of FIG. 2 where two of the booster motors are being simultaneously ejected from the rear of the projectile.

FIG. 5 shows an example embodiment where two of the booster motors 21A, 21D are ejected from the rear of the casing 30. The two boosters 21A, 21D would be ejected simultaneously (i.e. in symmetric fashion) to minimize any instability that would otherwise be imparted to the remaining projectile 10.

Depending on the complexity of the guidance system 11, the guidance system 11 may eject the motors 20, 21A, 21B, 21C, 21D, 21E, 21F in order to appropriately adjust the speed of the projectile 10. As an example, the guidance system 11 may determine that only some burned out motors should be ejected while other remain attached.

Keeping some of the motors attached maintains the weight of the projectile 10 and causes the projectile 10 to move slower than if the burned out motors were ejected from the projectile 10. If more speed is desired for the projectile 10, then more of the burned out motors would be ejected. Embodiments are also contemplated where the guidance system 11 ejects motors before they are burned out in order to appropriately adjust the speed of the projectile 10.

It should be noted that the motors 20, 21A, 21B, 21C, 21D, 21E, 21F may be attached to one another and/or a frame of the projectile 10 in any manner. The configuration of the motors 20, 21A, 21B, 21C, 21D, 21E, 21F will depend in part on (i) the types of motors that are used in the projectile; (ii) the potential need to eject the booster motors 21A, 21B, 21C,

21D, 21E, 21F; and (iii) the space available within the projectile 10 (among other factors).

Figure 6:
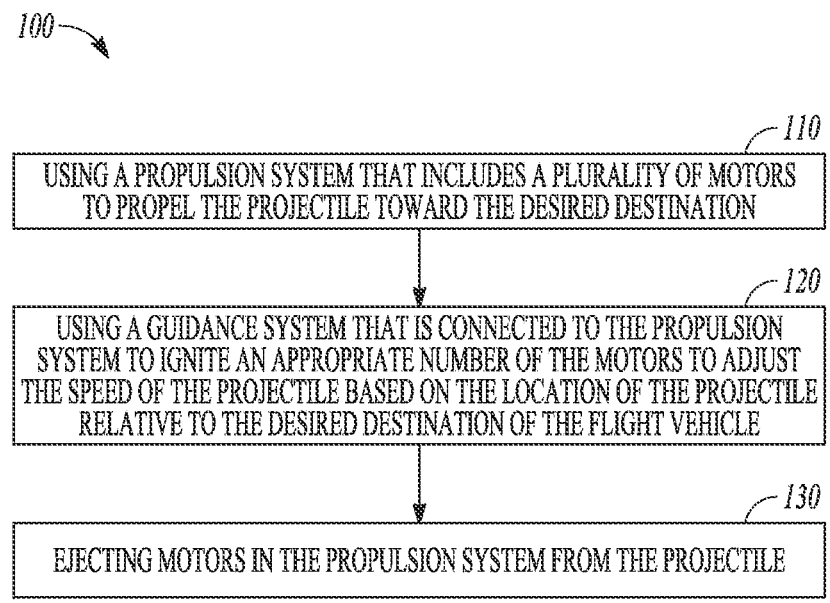
FIG. 6 is a flow diagram illustrating an example method of delivering a projectile that includes a flight vehicle to a desired destination in accordance with some embodiments.

FIG. 6 is a flow diagram illustrating an example method 100 of delivering a projectile 10 that includes a flight vehicle 18 to a desired destination in accordance with some embodiments. As shown in box 110, the method 100 includes using a propulsion system 12 that includes a plurality of motors 20, 21A, 21B, 21C, 21D, 21E, 21F to propel the projectile 10 toward the desired destination. As shown in box 120, the method further includes using a guidance system 11 that is connected to the propulsion system 12 to ignite an appropriate number of the motors 20, 21A, 21B, 21C, 21D, 21E, 21F to adjust the speed of the projectile 10 based on the location of the projectile 10 relative to the desired destination of the flight vehicle 18.

In some embodiments, using the propulsion system 12 to propel the projectile 10 that includes a flight vehicle 18 may include using the propulsion system 12 to propel a kinetic warhead. The type of flight vehicle 18 that is included on the projectile 10 will depend in part on the application where the method 100 is being used.

Embodiments for the method 100 are contemplated where using a propulsion system 12 that includes a plurality of motors 20, 21A, 21B, 21C, 21D, 21E, 21F to propel the projectile includes using a propulsion system that includes a center motor 20 surrounded by an even number of booster motors 21A, 21B, 21C, 21D, 21E, 21F. It should be noted that the center motor 20 may provide navigational control. As an example, the center motor 20 may include axial and/or lateral thrust capability depending on the type of center motor 20 that is used to propel the projectile 10.

The number of booster motors 21A, 21B, 21C, 21D, 21E, 21F that will be ignited by the guidance system 11 will depend on the speed that the projectile 10 needs to be adjusted to in order to maneuver the projectile 10 to a desired location. This appropriate speed will be calculated by the guidance system 11 based on data that is provided to the guidance system 11.

In some embodiments, using a guidance system 12 to ignite an appropriate number of the motors 21A, 21B, 21C, 21D, 21E, 21F to adjust the speed of the projectile 10 includes igniting an even number of booster motors 21A, 21B, 21C, 21D, 21E, 21F. It should be noted that any sequence and/or quantity of an even number of the booster motors 21A, 21B, 21C, 21D, 21E, 21F may be ignited depending on a the desired flight path of the projectile 10.

In other embodiments, using a guidance system 11 to ignite an appropriate number of the booster motors 21A, 21B, 21C, 21D, 21E, 21F to adjust the speed of the projectile 10 may include igniting booster motors 21A, 21B, 21C, 21D, 21E, 21F on opposing sides of the center motor 20. It should be noted that any sequence and/or quantity of booster motors 21A, 21B, 21C, 21D, 21E, 21F may be ignited depending on the desired flight path of the projectile 10 as long as the respective booster motors 21A, 21B, 21C, 21D, 21E, 21F are on opposing sides of the center motor 20.

In still other embodiments, using a guidance system 11 to ignite an appropriate number of the motors 21A, 21B, 21C, 21D, 21E, 21F to adjust the speed of the projectile 10 may include igniting booster motors 21A, 21B, 21C, 21D, 21E, 21F positioned at equal intervals around the center motor 20. It should be noted that any sequence and/or quantity of booster motors 21A, 21B, 21C, 21D, 21E, 21F may be ignited depending on a the desired flight path of the projectile 10 as long as the respective booster motors 21A, 21B, 21C, 21D, 21E, 21F are positioned at equal intervals around the center motor 20. As an example, the guidance system 11 may ignite booster motors 21A, 21C, 21E or booster motors 21B, 21D, 21F.

Embodiments for the method 100 are contemplated where using a propulsion system 12 that includes a plurality of motors 20, 21A, 21B, 21C, 21D, 21E, 21F includes (i) using a first propulsion stage 16 to propel the projectile 10; (ii) ejecting the first propulsion stage 16; (iii) using a second propulsion stage 14 to propel the projectile 10; (iv) ejecting the second propulsion stage 14; and (v) using a third propulsion stage 13 to propel the projectile 10 where the third propulsion stage 13 includes the center motor 20 surrounded by the booster motors 21A, 21B, 21C, 21D, 21E, 21F. It should be noted that other embodiments are contemplated where the propulsion system 12 forms part of the first and/or second stage 14, 16.

In some embodiments, using a propulsion system 12 to propel the projectile 10 toward the desired destination includes using the propulsion system 12 to propel the projectile 10 toward a target. As an example, using the propulsion system 12 to propel the projectile 10 toward a target may include using the propulsion system 12 to propel the projectile 10 toward a continually changing location of a moving target.

As shown in box 130, the method 100 may further include ejecting motors in the propulsion system 12 from the projectile 10. In some embodiments, ejecting motors 20, 21A, 21B, 21C, 21D, 21E, 21F in the propulsion system 12 from the projectile 10 includes ejecting the motors 20, 21A, 21B, 21C, 21D, 21E, 21F after burn out. As an example, using a guidance system 11 to adjust the speed of the projectile 10 may include determining whether to eject the burned out motors 20, 21A, 21B, 21C, 21D, 21E, 21F based on a desired speed of the projectile 10.

It should be noted that any of the motors 20, 21A, 21B, 21C, 21D, 21E, 21F may be ejected laterally or out of the rear of a casing 30 of the projectile 10. The manner in which the motors 20, 21A, 21B, 21C, 21D, 21E, 21F are ejected will depend in part on the overall configuration of the projectile 10.

As an example, two of the booster motors 21A, 21D may be ejected from the rear of the casing 30. The two boosters 21A, 21D may be ejected simultaneously (i.e. in symmetric fashion) to minimize any instability that would otherwise be imparted to the remaining projectile 10.

It should be noted that the motors 20, 21A, 21B, 21C, 21D, 21E, 21F may be attached to one another and/or a frame of the projectile 10 in any manner that facilitates ejecting motors 20, 21A, 21B, 21C, 21D, 21E, 21F. The configuration of the motors 20, 21A, 21B, 21C, 21D, 21E, 21F will depend in part on (i) the types of motors that are used in the projectile; (ii) the potential need to eject the booster motors 21A, 21B, 21C, 21D, 21E, 21F; and (iii) the space available within the projectile 10 (among other factors).

Depending on the complexity of the guidance system 11, the guidance system 11 may eject the motors 20, 21A, 21B, 21C, 21D, 21E, 21F in order to appropriately adjust the speed of the projectile 10. As an example, the guidance system 11 may determine that only some burned out motors 20, 21A, 21B, 21C, 21D, 21E, 21F should be ejected while other remain attached.

Keeping some of the motors 20, 21A, 21B, 21C, 21D, 21E, 21F attached maintains the weight of the projectile 10 and causes the projectile 10 to move slower than if the burned out motors 20, 21A, 21B, 21C, 21D, 21E, 21F were ejected from the projectile 10. If more speed is desired for the projectile 10, then more of the burned out motors 20, 21A, 21B, 21C, 21D, 21E, 21F would be ejected. Embodiments are also contemplated where the guidance system 11 ejects motors before they are burned out in order to appropriately adjust the speed of the projectile 10.

The projectiles and methods described herein may provide the ability to tailor a velocity path for the projectile that allows a flight vehicle on the projectile to travel to a desired destination (e.g., a moving target). In addition, the projectile utilizes relatively safe and storable solid motor technology that provides performance similar to liquid motor propulsion system.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, the embodiments may lie in less than all features of a single disclosed embodiment. Thus the following claims are hereby incorporated into the detailed description, with each claim standing on its own as a separate embodiment.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of embodiments of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of embodiments of the invention(s).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A projectile comprising:
   a flight vehicle;
   a propulsion system attached to the flight vehicle, the propulsion system including a plurality of motors that propel the projectile in the same direction; and
   a guidance system connected to the propulsion system, the guidance system determining and igniting an appropriate number of the motors to adjust the speed of the projectile based on a location of the projectile relative to a desired destination for the flight vehicle.

2. The projectile of claim 1 wherein the flight vehicle is a kinetic warhead.

3. The projectile of claim 1 wherein the plurality of motors includes a center motor surrounded by booster motors.

4. The projectile of claim 3 wherein the projectile includes a first propulsion stage, a second propulsion stage and a third propulsion stage, the first propulsion stage being at a tail end of the projectile, the second propulsion stage positioned between the third propulsion stage and the first propulsion stage, and the third propulsion stage between the second propulsion stage and the flight vehicle, the propulsion system being part of the third propulsion stage.

5. The projectile of claim 3 wherein the guidance system ignites an even number of the booster motors.

6. The projectile of claim 3 wherein the guidance system ignites the booster motors on opposing sides of the center motor.

7. The projectile of claim 3 wherein the guidance system ignites booster motors positioned at equal intervals around the center motor.

8. The projectile of claim 1 wherein the desired destination is a location of a target.

9. The projectile of claim 8 wherein the desired destination is a continually changing location of a moving target.

10. The projectile of claim 1 wherein each of the motors in the propulsion system is adapted to be ejected from the projectile.

11. The projectile of claim 10 wherein the guidance system determines whether to eject the motors based on a desired speed of the projectile.

12. The projectile of claim 11 wherein each of the motors in the propulsion system is adapted to be ejected from the projectile after burn out.

13. A projectile comprising:
    a flight vehicle;
    a propulsion system attached to the flight vehicle, the propulsion system including a plurality of motors that propel the projectile; and
    a guidance system connected to the propulsion system, the guidance system ejecting an appropriate number of the motors to adjust the speed of the projectile based on the location of the projectile relative to a desired destination for the flight vehicle.

14. The projectile of claim 13 wherein the guidance system ejects an appropriate number of the motors to adjust the speed of the projectile once the respective motors are burned out.

15. A method of delivering a projectile that includes a flight vehicle to a desired destination, the method comprising:
    using a propulsion system that includes a plurality of motors to propel the projectile in the same direction toward the desired destination; and
    using a guidance system that is connected to the propulsion system to determine and ignite an appropriate number of the motors to adjust a speed of the projectile based on a location of the projectile relative to the desired destination of the flight vehicle.

16. The method of claim 15 wherein using the propulsion system to propel the projectile includes using the propulsion system to propel a kinetic warhead.

17. The method of claim 15 wherein using the propulsion system that includes the plurality of motors to propel the projectile includes using the propulsion system that includes a center motor surrounded by an even number of booster motors.

18. The method of claim 17 wherein using the propulsion system that includes the plurality of motors includes:
    using a first propulsion stage to propel the projectile;
    ejecting the first propulsion stage;
    using a second propulsion stage to propel the projectile;
    ejecting the second propulsion stage;
    using a third propulsion stage to propel the projectile, wherein the third propulsion stage includes the center motor surrounded by the even number of booster motors.

19. The method of claim 18 wherein using the guidance system to ignite an appropriate number of the motors to adjust the speed of the projectile includes igniting an even number of booster motors.

20. The method of claim 19 wherein using the guidance system to ignite an appropriate number of the motors to adjust the speed of the projectile includes igniting booster motors on opposing sides of the center motor.

21. The method of claim 17 wherein using the guidance system to ignite an appropriate number of the motors to adjust the speed of the projectile includes igniting booster motors positioned at equal intervals around the center motor.

22. The method of claim 15 wherein using the propulsion system to propel the projectile toward the desired destination includes using the propulsion system to propel the projectile toward a target.

23. The method of claim 22 wherein using the propulsion system to propel the projectile toward a target includes using the propulsion system to propel the projectile toward a continually changing location of a moving target.

24. The method of claim 15 further comprising ejecting motors in the propulsion system from the projectile.

25. The method of claim 24 wherein ejecting motors in the propulsion system from the projectile includes ejecting the motors after burn out.

26. The method of claim 25 wherein using a guidance system to adjust the speed of the projectile includes determining whether to eject the burned out motors based on a desired speed of the projectile.

27. A projectile configured to:
use a propulsion system that includes a plurality of motors to propel the projectile toward a desired destination; and
use a guidance system to ignite an appropriate number of the motors to adjust a speed of the projectile based on a location of the projectile relative to the desired destination for the projectile.

28. The projectile of claim 27 wherein the projectile is configured to eject motors in the propulsion system from the projectile.

29. The projectile of claim 28 wherein the projectile is configured to use the guidance system to adjust the speed of the projectile by determining whether to eject burned out motors based on a desired flight path of the projectile toward the desired destination.

* * * * *